LOREN L. ALDERSON
INVENTOR

Nov. 23, 1971    L. L. ALDERSON    3,621,761
BIASING MEANS FOR HYDRAULIC DEVICE
Filed July 27, 1970    4 Sheets-Sheet 2

LOREN L. ALDERSON
INVENTOR

ATTORNEY    AGENT

LOREN L. ALDERSON
INVENTOR

United States Patent Office 3,621,761
Patented Nov. 23, 1971

3,621,761
BIASING MEANS FOR HYDRAULIC DEVICE
Loren L. Alderson, Hutchinson, Kans., assignor to The
Cessna Aircraft Company, Wichita, Kans.
Filed July 27, 1970, Ser. No. 58,534
Int. Cl. F01b 3/00, 13/00
U.S. Cl. 91—491                                   16 Claims

ABSTRACT OF THE DISCLOSURE

A positive displacement fluid device having a biasing spring associated with the pistons for urging the pistons of the fluid device toward a camming surface which induces piston reciprocation. The biasing springs are of a predetermined length less than the length of the piston stroke so as to engage and act on the piston only during a predetermined portion of the piston stroke thereby reducing spring flexure and fatigue, yet providing sufficient biasing force to continuously overcome the tendency of the piston to lift off the cam. In the preferred embodiment, the length of the springs approximate the mean distance of the piston stroke and bias the piston only through that half of the stroke during which the piston accelerates toward the cam surface. In other arrangements, the length of the spring may be varied to act for more or less than one-half of the stroke and, either singly or in conjunction with other biasing means, provide initial preload on the piston at the zero displacement position of variable displacement units.

BACKGROUND OF THE INVENTION

This invention relates to positive displacement hydraulic devices utilizing one or more fluid displacing members experencing periodic reciprocation by cooperation with a cam member to form variable volume fluid chambers. More particularly, the invention relates to improved biasing means of the type engaging and reciprocating with the fluid displacing members to urge same toward the cam member.

Positive displacement pumps or motors of the type referred to generally employ a cylinder block having an opening slidably receiving the fluid displacing member which extends outwardly of the opening to engage a cam surface. The fluid displacing member reciprocates upon relative rotation between the cylinder block and cam surface. It is necessary to proper operation and optimum efficiency that the fluid displacing member remain in engagement with the cam surface throughout its full period of reciprocation which, accordingly, requires the fluid displacing member to accelerate toward, then away from, the cam surface as it reciprocates. Acceleration away from the cam surface naturally arises by cooperation of the fluid displacing member with the cam surface.

A first type of prior art device achieves acceleration of the fluid displacing member toward the cam surface by inclusion of compressible spring biasing means continually engaging the fluid displacing member and flexing therewith and urging it toward the cam surface; however, the high flexure and consequent fatigue experienced by such a spring sharply curtails its applicability and often leads to its premature failure.

An alternate solution of prior devices is use of a single, nonflexing biasing means which simultaneously accelerates all the fluid displacing members toward the cam surface. Such arrangement has several drawbacks; it is usable only in certain designs of hydraulic devices, having found acceptance only in axial piston devices; it creates more complicated and expensive structure; and it requires a relatively large, bulky and strong spring that induces unnecessarily high friction and wear.

SUMMARY OF THE INVENTION

The invention contemplates variable length biasing spring means of the first type described above, associated with each piston or equivalent fluid displacing member of a hydraulic positive displacement device, the improved spring means being subject to less flexure and fatigue as compared to prior art. Each spring intermittently compresses between opposing first and second abutments; one abutment is carried upon the piston so that the abutments reciprocate relative to one another to define minimum and maximum distance of separation therebetween. The spring has a predetermined maximum length intermediate these minimum and maximum distances such that the spring compresses between the abutments and biases the fluid displacing member for only a predetermined portion of the periodic reciprocation of the fluid displacing member. One embodiment provides a spring whose maximum length is the average of the minimum and maximum distances between the abutments to bias the fluid displacing member throughout that one-half portion of its stroke in which it accelerates toward the cam surface. Another embodiment advantageously combines a somewhat shorter spring with the conventional nonflexing biasing means discussed above, while another embodiment utilizes a slightly longer spring to create neutral position spring bias in variable displacement units.

Accordingly, it is a general object of the present invention to provide improved biasing means of the type which engage and flex with the fluid displacing member, by reducing the flexure to which the biasing means are subject without impairing their usefulness or operability.

More particularly, it is an object of the invention to provide spring biasing means engaging and biasing the fluid displacing member toward the cam surface only during a predetermined portion of the member's periodic reciprocation.

Another objective in accordance with the preceding object is to provide biasing means that do not bias the fluid displacing member during a portion of its stroke where it accelerates inwardly away from the cam surface through its cooperation with the cam surface.

It is another object of the present invention to provide improved biasing means adaptable for use in various hydraulic pump-motor constructions.

These and other more specific objects and advantages of the invention are set forth in, or will become apparent from, the following detailed description and accompanying drawings.

DETAILED DESCRIPTION OF THE PREFERRED EMBODIMENTS

Figure 1:
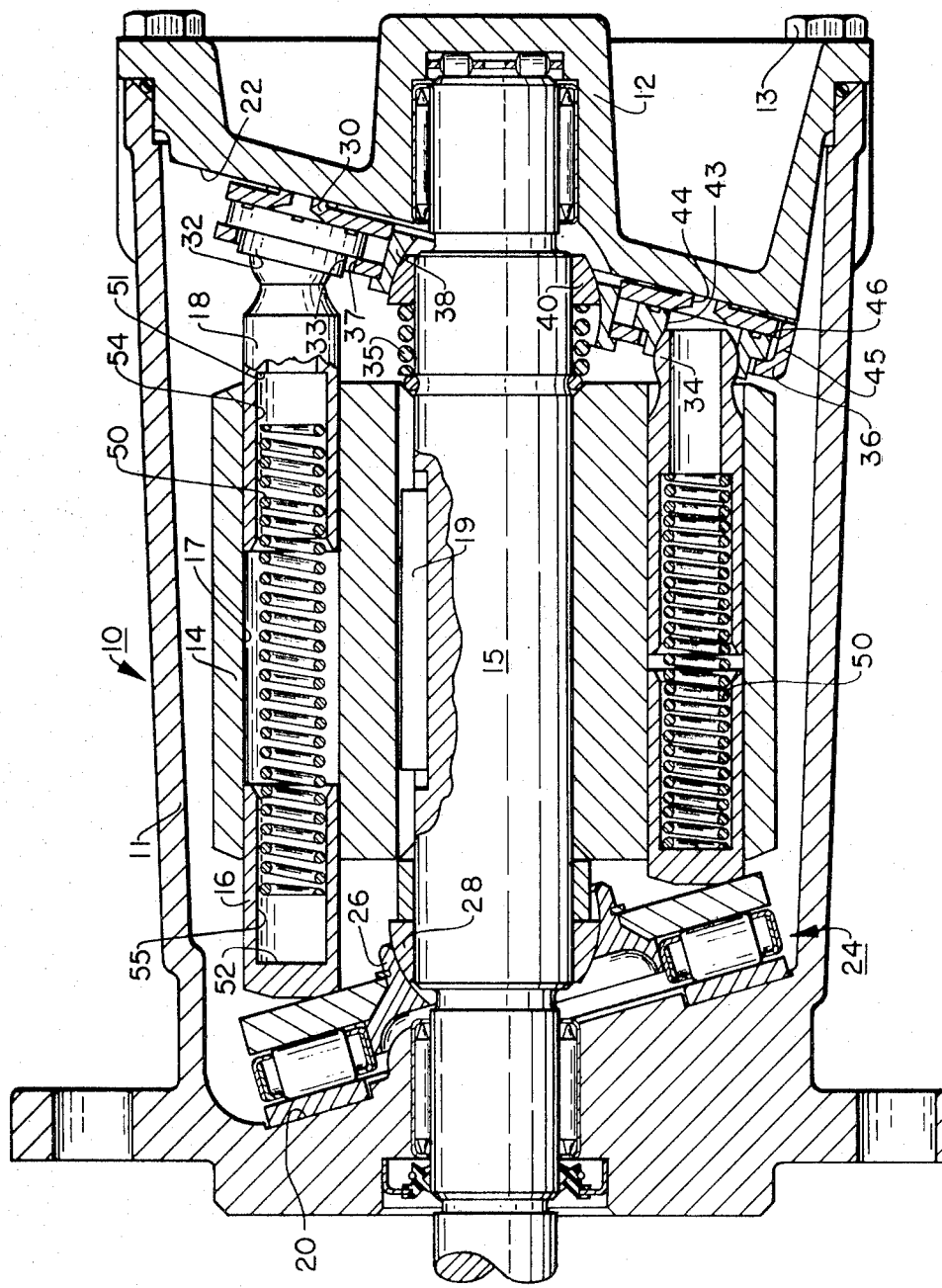
FIG. 1 is an offset longitudinal view of a double-ended axial piston device incorporating the present invention.

FIG. 1 illustrates an axial piston pump or motor, generally designated by the number 10 of the double-ended type utilizing pairs of opposing pistons 16 and 18 reciprocal in each through cylinder bore or camber 17 of a cylinder barrel 14. The unit has an outer housing comprised of a hollow casing 11 secured by bolts 13 to an end plate 12 closing one end of the casing. Key 19 drivingly interconnects the axially extending shaft 15 and cylinder block 14, the shaft driving the cylinder barrel for pumping operation and the barrel driving the shaft for motoring function.

Pistons 16 and 18 extend from barrel 14 to cooperate with oppositely inclined surfaces 20 and 22 of casing 11 and end plate 12 which induce piston axial reciprocation as the barrel rotates. A central pivot 28 and member 26 radially pilot and locate a mechanical bearing assembly 24 interposed between pistons 16 and surface 20 to absorb axial thrust of pistons 16. Similarly, a connector plate 30, located intermediate inclined cam surface 22 and slipper shoes 32 absorbs axial thrust of pistons 18. Shoes 32 have inner spherical sockets pivotally swaged upon cooperating piston surfaces 34, and the shoes 32 extend through enlarged holes 37 of a spider or cage plate 36 which engages the enlarged flanges of the slipper shoes. Radially locating both spider 36 and connector plate 30 are central pilot 38 and pivot 40 which have cooperating spherical surfaces permitting relative oscillation therebetween during unit operation. Spring 35 exerts a light biasing force urging the shoes and pistons 18 toward connector plate 30 by acting against the shoe flanges through pivot 40, pilot 38 and spider plate 36.

Piston chambers 17 communicate with inclined surface 22 through aligned interior passages 54, 43 and 44 in the pistons, shoes and connector plate respectively, a separate connector plate passage 44 provided for each shoe interior passage 43. Opening onto cam surface 22 and thereby communicating with piston chambers 17 are separate fluid inlet and discharge valving passages (not shown) in end plate 12 that communicate with external inlet and outlet ports in the end plate. The valving passages, conventional and well known to the art, consist of separated arcuate slots on surface 22 aligned with connector plate passages 44. During the half-revolution when the pistons are moving axially outwardly, chambers 17 communicate with one of the arcuate slots, and during the other half-revolution when the pistons are retracting back into chambers 17, the chambers 17 then communicate with the other valving slot. A hydrostatic fluid bearing absorbs axial thrust from pistons 18 created by pressure in the piston bores. Pressure fluid from chambers 17 leaks between the cooperating flat surface of connector plate 36 and end plate surface 22 to establish the fluid bearing at the interface.

Pistons 16 transmit rotary driving torque to spider 36 at the point of contact of the outer surface 33 of a slipper shoe with the wall of the associated spider hole 37. The spider and connector plate drivingly engage through a tooth 45 and groove 47 connection, and the connector plate 30 rotates in synchronization with the spider plate 36, pistons and cylinder block.

Unit 10 is disclosed within commonly assigned copending U.S. application No. 037,946, of Frank N. Allexander and Loren L. Alderson, filed May 18, 1970, to which reference may be made for further description of the structure and operation of unit 10, although not necessary to the understanding and practice of the present invention.

The present invention relates to novel spring means 50 within each cylinder chamber 17. Spring 50 is a relatively long helical coil compression spring situated between shoulder 51 of piston 18 and face 52 of piston 16, the shoulder and face constituting abutment means for spring 50. The reciprocating action of the pistons 16, 18 causes separating movement of the spring abutment means 51, 52 from a point of minimum to maximum separation therebetween. The location of maximum separation will hereinafter be conveniently referred to as "Top Dead Center" (TDC), the upper pistons in FIG. 1 being shown at such position, which is the point where a working piston finishes its outward stroke and begins its inward stroke. Conversely minimum separation occurs at what will be referred to as "Bottom Dead Center" (BDC), the lower pistons in FIG. 1 being shown at such position, where a piston completes its inward stroke and begins its outward stroke.

Springs 50 have a relaxed length substantially less than the maximum separation between the spring abutments 51 and 52. Each spring 50 engages and exerts outward biasing forces on its associated pistons 16 and 18 only during a portion of a revolution of the cylinder block. Springs 50 engage the pistons approximately half-way between TDC and BDC. That is, the relaxed length of the springs is approximately equal to the average of the maximum and minimum separation between abutments 51 and 52. Accordingly, the springs engage the pistons when the pistons are within approximately ninety degrees rotation of BDC, the position of minimum separation.

Figure 2:
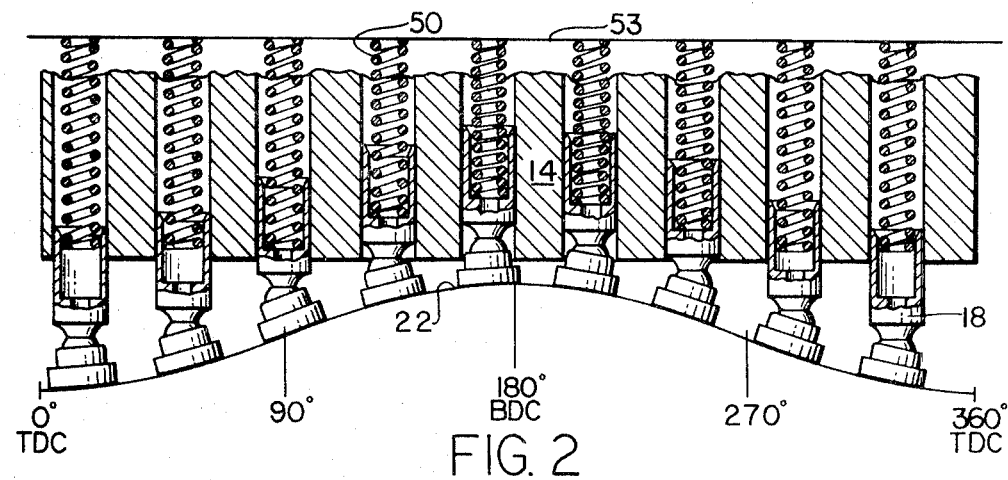
FIG. 2 is a schematic rectangular projection of the various positions taken by a piston and the biasing spring during unit operation.

FIG. 2, which is a flat projection view of the nine annularly arranged pistons 18, clearly shows the spring and piston engagement as the pistons travel a full revolution. In this view, the cam surface 22 appears as a negative cosine curve; rotation of the pistons is lateral movement, and axial reciprocation of pistons 18 is represented as vertical movement in FIG. 2. The set of oppositely arranged pistons 16 is deleted for clarity, and line 53 represents a spring abutment opposing piston shoulder 51. Traveling from left to right in FIG. 3, a piston and associated spring engage at ninety degrees rotation from TDC, and the spring continues to exert a biasing force on the piston through disengagement at 270° rotation.

Figure 3:
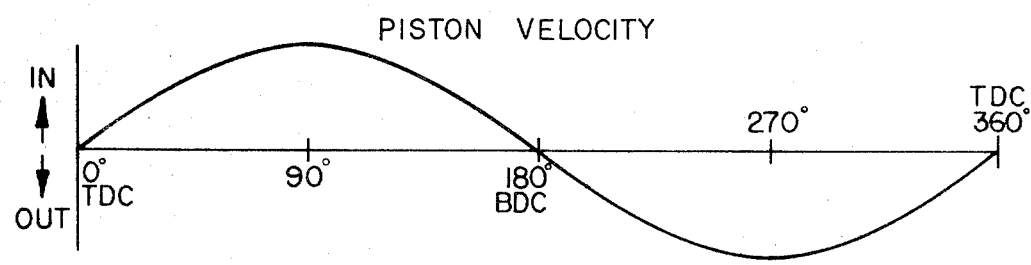
FIG. 3 is a graph plotting velocity of a piston through a full period of reciprocation.

The piston axial velocity profile, FIG. 3, is a sinusoidal curve showing the piston to be moving inwardly from zero to 180° rotation and outwardly from the cylinder block through the final one-half revolution. The piston axial velocity continually varies, finding maximum inward speed at 90° and maximum outward speed at the 270° position.

Figure 4:
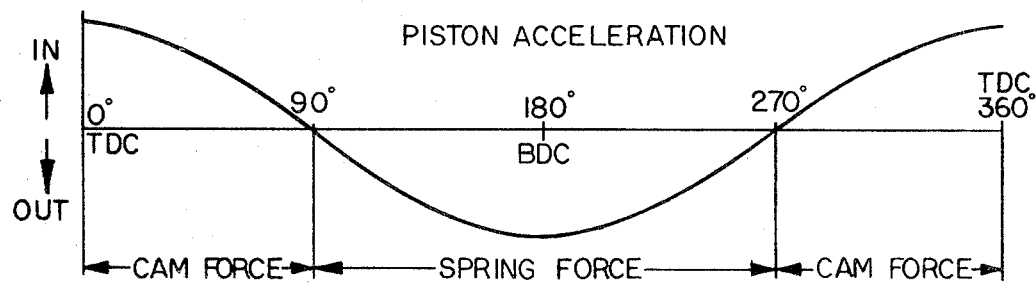
FIG. 4 is a graph plotting acceleration of a piston through a full period of reciprocation.

FIG. 4 illustrates the axial acceleration experienced by the piston, a cosine curve with maximum inward acceleration at TDC and maximum outward acceleration at BDC. Both FIGS. 3 and 4 illustrate piston velocity and acceleration under the assumption that the piston remains properly in contact with the cam surface. It is apparent from FIG. 4 that each piston accelerates outwardly only when it is within 90° of BDC, the position of minimum separation between the opposing abutments for spring 50. From zero to 90° and from 270° to 360°, the pistons accelerate inwardly by their cooperation with the inclined cam surface 22.

The springs 50 of the present invention exert outward biasing forces on their associated pistons only within 90° of BDC and, accordingly, match the outward axial acceleration required to hold the pistons in contact with the cam surface. By not exerting outward biasing forces on the pistons within 90° of TDC, where the cam surface is forcing pistons inwardly, the improved spring means reduce friction and mechanical efficiency losses. The shorter length, in comparison to prior art, of a spring 50 reduce flexure and fatigue and increases the life of spring 50.

Compression springs have natural force gradients whereby the forces they exert increase with compression. A spring 50 having a linear gradient (force increasing substantially constantly with each increment of compression) exerts a sinusoidally varying biasing force upon its associated piston 18 describing the sinusoidal reciprocating travel shown in FIG. 2. Such linear gradient springs 50 accordingly exert biasing forces matching the required outward piston acceleration, FIG. 4, when within 90° of BDC. It will be apparent that the lack of spring biasing force when a piston is within 90° of TDC does not impair proper operation of the device as the piston is then experiencing inward acceleration.

Bores 54 and 55 within pistons 18 and 16, respectively, permit the use of springs 50 of relatively great relaxed length that are adapatable to substantial compression and maintain an acceptable gradient throughout their stroke. Springs 50 fit relatively closely to bores 54, 55 and are longitudinally guided therein to avoid cocking and misalignment. The depth of bores 54, 55 and maximum length of springs 50 are most advantageously chosen such that the spring can never fully retract out of either piston bore 54, 55 and each spring is continuously guided therein.

FIG. 5 EMBODIMENT

Figure 5:
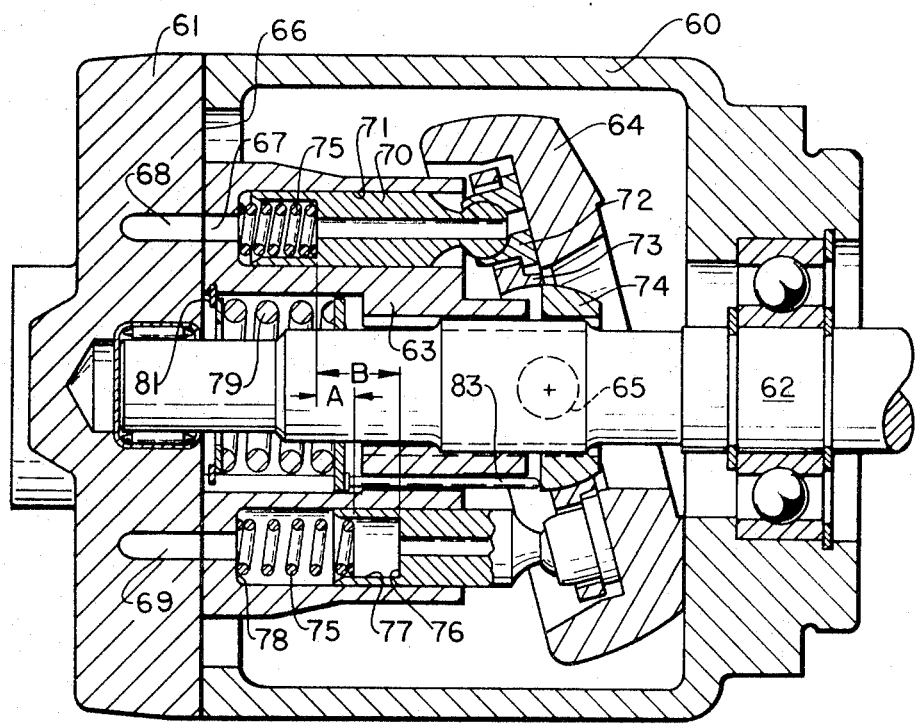
FIG. 5 is an offset longitudinal view of a variable displacement, single-ended unit incorporating another form of the invention.

FIG. 5 illustrates the invention as incorporated in a variable displacement axial piston pump or motor unit. The unit has a two-piece housing, casing 60 and backplate 61 to which a rotating drive shaft 62 is bearing mounted. A cylinder block 63 drivingly connects to the shaft through a splined connection, and a tiltable cam plate 64 mounts to the casing 60 on trunnions 65, one of which is illustrated by dashed lines. A flat face of cylinder block 63 closely mates with a valving surface 66 of the backplate so that a plurality of cylinder block ports 67 alternately communicate with separated valving slots 68, 69 in the backplate opening onto surface 66. Slots 68, 69 respectively connect with a fluid inlet and outlet (not shown).

A positive displacement piston 70 slidingly fits within each cylinder chamber 71 of the cylinder block, with one end extending outwardly of the block to engage the cam plate. Upon rotation of the cylinder block, each piston, by cooperating with the inclined cam, reciprocates axially within its associated chamber, and fluid discharges through port 67, slot 69 and the fluid outlet during the retraction portion of the piston stroke. Fluid is drawn from the inlet through slot 68 and port 67 into the cylinder chamber 71 during the extending portion of the piston stroke.

Wear shoes 72 pivotally attached to the outer spherical piston ends to provide a good thrust absorbing interface between the piston and cam surface. A spider plate 73 and central pivot 74, similar to those of FIG. 1, engage the shoes 72 to hold the pistons and shoes in fairly close proximity to the cam plate. Central spring 79 located in a central bore of the cylinder block acts through pivot 74 to assist the piston biasing springs 75 in urging the pistons and attached shoes 72 toward the cam surface. Spring 79 acts through snap ring 81 to urge the cylinder block toward the backplate, and acts against pivot 74 through a plurality of pins 83 extending through holes in the cylinder block to contact the pivot. In this arrangement of spring 79, well known to the art, the central spring continuously exerts a constant bias force on all pistons 70 and experiences little or no flexure during cylinder block rotation.

Improved spring means 75 in each chamber 71 extend between an abutment shoulder 76 formed within an inner bore 77 of each piston and an opposing abutment 78 of the cylinder block at the bottom of chamber 71. As in FIG. 1, each spring 75 has a noncompressed relaxed length substantially less than the maximum distance of separation between abutments 76, 78 so that during a predetermined portion of cylinder block revolution and piston stroke, the spring 75 exerts no bias force on the associated piston. In FIG. 5, the lower piston is in such condition, being withdrawn sufficiently out of chamber 71 that the distance between abutments 76, 78 is greater than the maximum length of spring 75. Note that in FIG. 5, in contrast to FIG. 1, the lower piston is at the fully extended TDC position, while the upper piston is at the fully retracted BDC postion. The maximum length of springs 75 may be chosen, as in FIG. 1, as the average between the minimum and maximum distances of abutment separation to provide an outward acceleration on the piston throughout the entire one-half of the piston stroke that requires outward acceleration.

The springs 75 illustrated, however, are of maximum length substantially less than this "abutment average distance." The distance denoted by the letter A in FIG. 5 is the full compression stroke of spring 75, being measured between the locations of the right end of spring 75 at the fully retracted upper piston and fully extended lower piston. Distance B is the travel of piston abutment 76 and accordingly denotes the full length of the piston stroke. It is apparent in FIG. 5 that the spring stroke A is somewhat less than half of the piston stroke B. A spring 75 engages and biases its associated piston over a relatively short arc extending, for instance, 45° or less on both sides of BDC. Referring to FIG. 4, which illustrates acceleration of pistons 70 of FIG. 5 as well as pistons 78 of FIG. 1, it will be apparent that outward acceleration is greatest near BDC. Consequently, the short spring 75 of FIG. 5 creates the outward biasing force where most needed. Working in concert with central spring 79, the piston springs 75 provide the needed piston outward acceleration to hold same in desired contact with the surface. Because the springs 75 exert a large portion of the bias force, the central spring is considerably reduced both in size and strength requirements in comparison to the prior art method of using a central spring creating all the bias force. The problems of designing the central spring into the unit are accordingly drastically simplified. Also, the force exerted by spring 79 on a piston within 90° of TDC where no bias is needed, sbustantially reduces compared to prior art to mitigate friction, wear and unnecessarily high efficiency losses.

Figure 6:
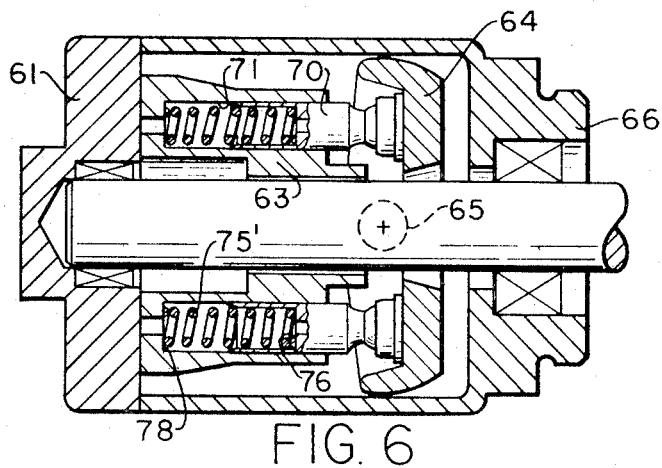
FIG. 6 is an offset longitudinal view of a unit similar to FIG. 5 showing the cam at zero displacement position.

The maximum length of the piston springs may alternately be chosen slightly greater than the average of the minimum and maximum separation between abutments 76, 78 and yet other distinct advantages arise. Such arrangement is illustrated in FIG. 6. First, the spring 75' will provide, as previously discussed, all the piston outward acceleration required to hold the piston against the cam plate. Secondly, a spring 75' slightly longer than the abutment average distance creates an outward piston biasing force upon positioning of the cam plate at its perpendicular neutral position illustrated in FIG. 6. In neutral, the cam plate stands perpendicular to the longitudinal shaft axis and the pistons, so that the pistons experience no reciprocating within chambers 71 during cylinder block rotation. Also, in neutral, the distance between abutments 76, 78 is equal to the abutment average distance. Springs 75' are sufficiently long to compress and create the desired magnitude of outward biasing force on their associated piston in neutral position. Note that all springs 75' compress and bias their associated pistons in neutral. In contrast, a spring (as in FIG. 1) whose length matches the abutment average distance would just be touching both abutments 76, 78 in FIG. 6 but would not be compressed therebetween; and a spring (as in FIG. 5) shorter than the abutment average distance would be shorter than the distance of separation between the abutments in FIG. 6 neutral position.

Springs 75', as noted, have a maximum length slightly greater than the abutment average distance, yet substantially less than the distance of maximum abutment separation. Accordingly, springs 75' lose contact so as not to bias the pistons over a considerable arc near TDC, to reduce spring flexure and attain the attendant advantages already discussed.

The devices of FIGS. 5, 6 are of the reversible flow, "over-center" type wherein the cam plate 24 can be inclined oppositely to the inclination shown in FIG. 6. The springs 75 will function the same when the cam plate is oppositely inclined. It can be readily seen that, as the inclination of cam surface varies, the portion of cylinder block revolution during which the piston springs bias the pistons will remain constant if the spring has a relaxed length equal to the average abutment separation distance.

However, with the shorter spring length in FIG. 5, the portion of cylinder block rotation through which the springs bias the pistons will vary proportionally with cam plate inclination; at maximum inclination of the cam, the portion of piston reciprocation will be the maximum in which the pistons will experience bias from the springs, and at small inclinations and neutral position, the pistons never experience spring bias. On the other hand, the springs 75' of FIG. 6, being longer than the abutment average distance, will bias the pistons throughout their revolution when the cam is at neutral, but as the cam inclination increases the portion of reciprocation in which spring bias is experienced will reduce.

It will be apparent that other attendant advantages and desired combinations of those advantages specifically discussed may be realized dependent upon the length chosen for biasing springs 75, which length dictates the portion of cylinder block revolution and portion of piston reciprocation during which the piston spring 75 acts against and biases its associated piston. It also will be apparent that the same relationships and variations apply equally to pistons 50 of FIG. 1. Yet by limiting the length of the spring 50, 75, 75', to substantially less than the maximum separation between the spring abutments, spring flexure and fatigue drastically reduce without sacrifice of the spring's operation or usefulness and with actual simplification, rather than complication, of unit design.

FIG. 7 EMBODIMENT

Figure 7:
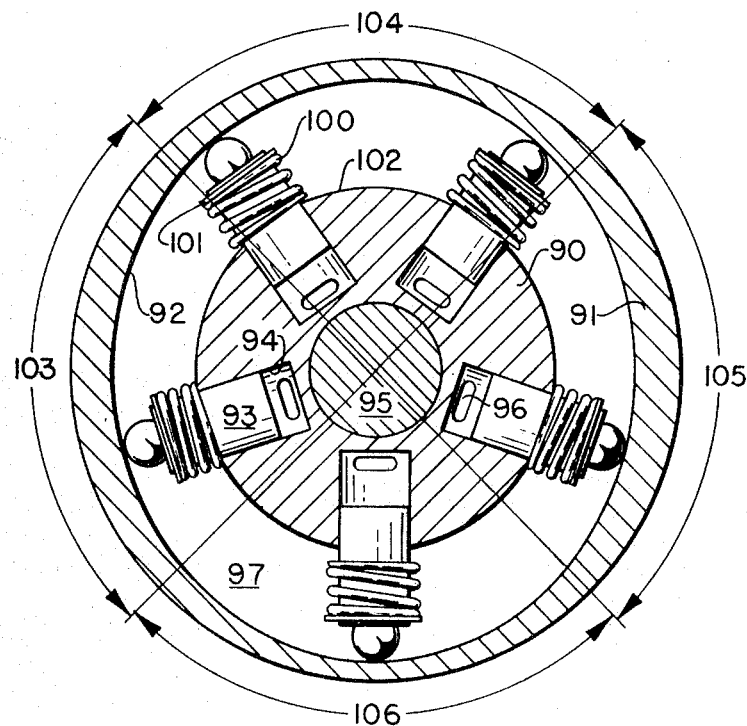
FIG. 7 is a transverse sectional view of a radial piston unit incorporating yet another form of the invention.

FIG. 7 illustrates another form of the present invention incorporated in a radially reciprocating, rotary hydraulic device. Shown is a radial piston pump or motor having piston carrying member or cylinder block 90 situated within the housing 91. Radially surrounding and spaced from block 90 is an elliptically formed cam surface 92 on the housing element. Pistons 93, reciprocally mounted in chambers 94 of the cylinder block, extend to the cam surface and have spherical balls at their outer ends engaging surface 92. The cylinder block is drivingly affixed to drive shaft 95 to effect relative rotation between cylinder block 90 and cam surface 92, whereupon the pistons 93 reciprocate within chambers 94 to alternately draw in and expel motive fluid through ports 96. Valving means, not shown, connect with ports 96 to collect and deliver inlet and outlet fluid respectively in a conventional manner well known to the art. The elliptical form of surface 92 creates a "multi-lobed" cam surface 92 causing inward and outward piston reciprocation twice each revolution. The pistons consequently discharge fluid twice and draw in fluid twice each revolution. The radial device thus far described is conventional and well known to the art.

In accordance with the present invention, a separate biasing spring 100 acts against and biases each piston 93 outwardly during a portion of piston reciprocation. The springs 100 extend between an abutment 101 formed on the pistons 93 and a second abutment 102 which is the outer surface of the cylinder block 93. Abutment 101 is shown as a snap ring in a groove at the outer piston end. The length of springs 100 is again substantially less than the maximum distance of separation between abutments 101, 102 to reduce flexure and increase spring life, but is sufficiently long to compress between the abutments and bias the pistons during about one-half of the periodic reciprocation of the pistons. In this manner, sufficient spring bias is exerted upon the pistons to hold them against the cam surface for proper unit operation. Because the pistons complete a full period of reciprocation in one-half the cylinder block rotation, each spring 100 acts against the associated piston in two different portions 103, 105 of a full rotation of the cylinder block, and does not bias the pistons in other separated portions 104, 106.

It will be readily apparent that the present invention is equally useful in radial vane pumps known in the art wherein the variable volume fluid working chamber is similar to chamber 97 of FIG. 7, being formed between two adjacent fluid displacing members, as well as numerous other devices having a fluid displacing piston member extending from a cylinder block member to a camming surface of another member spaced from the cylinder block. Further, the invention has equal utility in those hydraulic devices having a camming surface rotating relative to the cylinder block, rather than the opposite arrangement specifically described herein. More generally, the specific embodiments disclosed and described, as well as the various modifications discussed, are exemplary in nature and not limiting to the scope and spirit of the invention so far as set forth in the appended claims.

Having described my invention with sufficient clarity that those skilled in the art may construct and use it, I claim:

1. In a positive displacement fluid device having a housing, first and second members located at spaced positions in the housing and adapted to rotate relative to each other, and positive displacement means extending between said first and second members so as to produce a chamber whose volume varies during relative rotation between said first and second members, said positive displacement means reciprocably mounted in an opening in said first member and extending outwardly thereof to engage a camming surface of said second member which induces periodic reciprocation of said positive displacement means during said relative rotation; wherein the improvement comprises:
   first abutment means reciprocably carried upon said positive displacement means;
   second abutment means positioned opposing said first abutment means whereby the distance between said first and second abutment means varies between a predetermined maximum and minimum; and
   resilient biasing means cooperable with said first and second abutment means, said biasing means having a predetermined maximum relaxed length substantially less than said maximum distance between said first and second abutment means whereby said biasing means compress between said abutment means to urge said positive displacement means toward said camming surface only during a predetermined portion of said periodic reciprocation of the positive displacement means.

2. The device of claim 1 wherein said second abutment means are fixed upon said first member.

3. The device of claim 2 wherein said biasing means comprises a helical coil compression spring located within said opening in said first member.

4. The device of claim 1 wherein said biasing means is a helical coil compression spring concentrically surrounding said positive displacement means, said first abutment means comprises a shoulder formed on the outer surface of said positive displacement means and said second abutment means is fixed upon said first member.

5. The device of claim 1 wherein said biasing means engage and bias said positive displacement means throughout a first portion of said periodic reciprocation during which said positive displacement means accelerate toward said camming surface.

6. The device of claim 5 wherein said first portion is one-half of said periodic reciprocation and said biasing means maximum length is approximately equal to the average of said minimum and maximum distances between said first and second abutment means.

7. The device of claim 1 wherein said biasing means engage and bias said positive displacement means through substantially less than the entirety of a first portion of said periodic reciprocation during which said positive displacement means accelerate toward said camming surface and further including second biasing means effectively engaging and urging said positive displacement means toward said camming surface with substantially constant force at all times.

8. The device of claim 1 wherein said camming surface is movable in a direction relative to the first member to a neutral position where said positive displacement means do not reciprocate, said biasing means maximum length being greater than the distance between said first and second abutment means in said neutral position whereby said biasing means engage and bias said positive displacement means toward said camming surface with predetermined force in said neutral position.

9. In a rotary axial piston device comprising a housing having a cam surface at one end, a rotor mounted for rotation within the housing and having a plurality of axially extending chambers, an associated piston in each of said axial chamber extending outwardly to cooperate with said cam surface and periodically reciprocate within said chambers upon rotation of the rotor, and fluid carrying means selectively communicating with said chambers to receive and deliver fluid thereto, wherein the improvement comprises:
a first abutment reciprocably carried upon each of said pistons;
a second abutment carried in each of said chambers and positioned opposing said first abutment whereby the axial distance between said first and second abutments varies between a predetermined minimum and maximum; and
a compression spring in each of said chambers cooperaable with said first and second abutments, said spring having a predetermined maximum relaxed length substantially less than said maximum distance between said first and second abutments whereby said spring compresses between said abutments to urge said piston toward the cam surface only during a predetermined portion of said periodic reciprocation of the piston.

10. The device of claim 9 wherein said second abutment comprises the inner end of the axial chamber associated with said pistons.

11. The device of claim 9 wherein each piston has a blind central bore opening into the associated piston chamber and said first abutment comprises the inner end of said central bore and wherein said spring is continuously guided within said central bore throughout the entire piston reciprocation.

12. The device of claim 9 further comprising an oppositely extending second piston in each axial piston chamber and a second cam surface in said housing cooperating with said second pistons to reciprocate same in said chambers in unison with said reciprocation of the first pistons, said second abutment being fixed upon said second piston.

13. An axial piston device comprising: a housing; a cylinder block mounted for rotation within the housing and having a plurality of axial chambers; a stationary cam member at one end of the housing having a flat surface inclined to the cylinder block rotational axis; pistons in said chambers having outer ends extending to cooperate with said inclined surface and thereby reciprocate within said chamber between fully extended and fully retracted positions upon cylinder block rotation; valve means communicating with said chambers to alternately receive and deliver fluid thereto; first abutment means in each of said chambers; second abutment means carried on each of said pistons and reciprocating with each piston toward and away from said first abutment means to define minimum and maximum distances of separation between said abutment means; and a spring in said each chamber compressible between said first and second abutment means so as to urge the associated piston toward the inclined surface, said spring having a maximum relaxed length approximately equal to the average of said minimum and maximum abutment separation distances whereby said spring engages and urges said piston toward the inclined surface only when said piston is located within aproximately ninety degrees rotation of said fully retracted position.

14. A variable displacement axial piston device comprising: a housing; a cylinder block mounted for rotation in the housing and having a plurality of axial chambers; a cam member having a flat surface in driving relations with the cylinder block and movably mounted to the housing such that said surface is selectively inclineable between a position of maximum inclination and a neutral position where said surface is perpendicular to the cylinder block rotational axis; pistons in said chambers having outer ends extending toward said inclineable cam surface, said pistons reciprocal within said chambers between fully extended and fully retracted positions upon cyinder block rotation; valve means adapted to alternately connect said chambers with a fluid inlet and fluid outlet during cylinder block rotation; a first abutment on the cylinder block at each of said chambers; a second opposing abutment on each of said pistons reciprocal toward and away from said first abutment to define minimum and maximum distances of separation between said abutments when said cam member is at said maximum inclination position; and a spring in each of said chambers adapted to compress between said abutments and urge said piston toward the cam surface, said spring having a maximum relaxed length greater than the distance between said abutments when the cam member is at said neutral position, yet substantially less than said maximum abutment separation distance.

15. An axial piston device comprising: a housing; a drive shaft extending axially in the housing; a cylinder block in the housing in driving engagement with the drive shaft and having a plurality of axial chambers; pistons reciprocally disposed in said chambers; an inclined or inclineable cam member mounted at one end of the housing in driving relation with the pistons; valve means alternately connecting said chambers with an inlet and outlet upon cylinder block rotation; a central pivot surrounding the shaft and having an outer spherical surface; a sleeve having a spherical inner surface mating with said pivot spherical surface and effectively engaging said pistons; a first central spring acting against said pivot so as to constantly urge said pistons toward the cam plate; a first abutment on the cylinder block in each of said chambers; a second abutment on each of said pistons reciprocating therewith toward and away from said first abutment in a manner defining minimum and maximum distances of separation between said abutments; and a second spring in each of said chambers compressible between said first and second abutments to urge said each piston toward the cam member, each of said second springs having a maximum relaxed length intermediate said minimum and maximum abutment separation distances and substantially less than the average of said minimum and maximum distances whereby each second spring urges its associated piston toward the cam member during less than one-half of the period of reciprocation of the associated piston.

16. A radial piston hydraulic device comprising: a housing; a rotor mounted for rotation within the housing and having a plurality of radial chambers; a cam surface positioned within the housing radially spaced from and surrounding the rotor; pistons reciprocally disposed in said chambers having outer portions extending radially outwardly of the periphery of said rotor; said pistons arranged in driving relationship to the cam surface so as to periodically reciprocate within said chambers upon rotation of the rotor valve means alternately interconnecting said chambers with an inlet and an outlet to receive and deliver fluid to said chambers; a shoulder on said outer portion of each piston reciprocating therewith relative to the outer surface of said rotor to define minimum and maximum distances of separation between said rotor outer surface and said piston shoulder; and a helical coil compression spring surrounding each of said pistons generally extending between said piston shoulder and said rotor outer surface and compressible therebetween to urge said piston outwardly toward the cam surface, said spring having a maximum relaxed length intermediate said minimum and maximum separation distances and substantially less than said maximum separation distance.

References Cited

UNITED STATES PATENTS

| | | | |
|---|---|---|---|
| 1,136,363 | 4/1915 | Pepper | 91—500 |
| 2,331,694 | 10/1943 | Jeffrey | 91—486 |
| 2,617,360 | 11/1952 | Barker | 91—501 |
| 3,230,893 | 1/1966 | Hann | 91—505 |

WILLIAM L. FREEH, Primary Examiner

U.S. Cl. X.R.

91—501, 505